US006609284B2

(12) United States Patent

Sheridan et al.

(10) Patent No.: US 6,609,284 B2
(45) Date of Patent: Aug. 26, 2003

(54) METHOD OF CONVERTING A RAILCAR

(75) Inventors: Mark Sheridan, Elmhurst, IL (US); Dick Kloster, Schaumburg, IL (US); Jim Reid, Regina (CA); Darrin Smith, Moose Jaw (CA)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/828,047

(22) Filed: Apr. 6, 2001

(65) Prior Publication Data

US 2002/0043174 A1 Apr. 18, 2002

(30) Foreign Application Priority Data

Sep. 15, 2000 (CA) ............................................ 2319923

(51) Int. Cl.[7] ............................ B21K 21/16; B23P 6/00

(52) U.S. Cl. ................. 29/401.1; 29/402.06; 29/402.07

(58) Field of Search .......................... 29/401.1, 402.06, 29/402.07, 428, 426.1; 105/396, 378, 258, 355; 296/148, 155

(56) References Cited

U.S. PATENT DOCUMENTS 5,181,474 A * 1/1993 Miller ........................ 105/355
6,502,518 B1 * 1/2003 Miller ........................ 105/248

* cited by examiner

*Primary Examiner*—John C. Hong
(74) *Attorney, Agent, or Firm*—McDermott, Will & Emery

(57) ABSTRACT

The present invention relates to a method of converting box car from having a sliding door to having a plug door. In addition, the roof may be removed and the storage capacity within the box car may be increased by raising the roof of the box car and adding extensions to the sides of the box car. Moreover, the door opening may be increased by increasing the height of the roof. Further, the present invention relates to a method of creating a sealing surface around the perimeter of the door opening of the box car wherein the sealing surface is coplanar.

15 Claims, 8 Drawing Sheets

METHOD OF CONVERTING A RAILCAR

FIELD OF THE INVENTION

The present invention relates to a method of converting a railcar. More specifically, the present invention relates to converting a railcar having a sliding door into a railcar having a plug door. The method generally entails reconfiguring the sealing surface of the railcar door to accept the plug-type door thereby allowing a door mechanism that may seal to protect the contents of the rail car. Moreover, the present invention relates to a method of increasing the storage capacity and the clear door opening of the box car by raising the roof of the railcar.

BACKGROUND OF THE INVENTION

It is generally known to provide railcars for the storage and/or transport of goods, products and/or commodities across distances via rail lines. These goods may require protection from the elements, such as, for example, heat, water, cold or other like damaging phenomena. Further, it is also known to provide railcars having sliding door mechanisms that may be openable and closeable and may provide access to the interior of the railcar. A railcar having a sliding door may be latchable so as to provide a means for keeping the sliding door closed for the security of the goods, products and/or commodities stored therein. Typically, a box car may utilize a sliding door for closing over a door opening to keep goods, products and/or commodities therein.

Moreover, it is further known to provide railcars having plug doors. Plug doors are typically similar to sliding doors and may be openable and closeable so as to provide access to the interior of the railcar. However, a plug door may translate toward the railcar to seal the plug door against a sealing surface on the railcar. Plug doors typically allow for enhanced security of the goods, products and/or commodities that may be stored within the railcars, since the plug-type door mechanism seals against the railcar. Moreover, plug doors may be utilized in railcars that must maintain a constant atmospheric condition, such as, for example, coldness, heat or humidity so as to protect the goods, products and/or commodities contained therein. Further, the plug door may keep the goods, products and/or commodities secure from dirt, dust, mud and moisture.

Many railcars, especially older railcars, are typically constructed with a sliding door mechanism that may cover an entry or opening in the railcars. These railcars may be utilized within the industry to transport goods, products and/or commodities across distances or otherwise may be used to store these goods, products and/or commodities. However, as noted above, these sliding doors do not provide an effective seal around the perimeter of the entry or opening to keep undesirable materials out of the railcar, such as moisture, sunlight, air, dust or other materials. Therefore, a plug door is necessary to create a sealing surface around the perimeter of the entry or opening. However, it is difficult to build a railcar completely from scratch, especially when there are many railcars having sliding doors that can be converted into railcars having plug doors.

Moreover, the door opening on a railcar, otherwise known as the clear door opening ("CDO"), is defined by the inside surfaces of the door posts and the top and bottom sills. Typically the CDO of a railcar is constructed to allow a specific amount of goods, products and/or commodities to move into and out of the railcar. Specifically, goods, products and/or commodities may be contained on a pallet having a specific dimension that may fit within the CDO of a typical railcar. However, many railcars that require a plug door may add a flange around the perimeter of the door opening to create a sealing surface thereby substantially decreasing the CDO of the railcar. This flange may typically be attached to the inside surface of the door posts that define the width of the CDO. The flange may therefore decrease the CDO of the railcar. This may adversely affect the movement of certain sized pallets into and out of the railcar. Moreover, adding a flange around the perimeter of the door opening requires a modification or movement of the door posts, if the CDO is desired to be retained. This typically entails significant expenditures of time and money.

In addition, many railcars have been built having a relatively low height, which decreases the amount of storage space within the railcar. A method of converting a railcar is necessary, therefore, to raise the roof of existing railcars to add height to the railcars thereby increasing the storage volume of the railcars. Moreover, raising the roof of the railcar may further add to the CDO of the railcar, thereby allowing for the movement of larger pallets, or other units, of goods, products, and/or commodities into and out of the railcar.

Of course, railcars are built from scratch, and many require a door opening that may require a plug door to be sealed thereon to protect the good, product and/or commodity that may be contained therein. However, many railcars are built having a flange or other type of material attached to the inside surface of the door posts and top and bottom sills extending inwards toward the center of the door opening. This may require additional material to provide a sealing surface for the plug door to seal against. Moreover, the door opening may be reduced due to the inwardly disposed flange.

A method of converting a railcar is therefore necessary that overcomes the deficiencies as noted above. The present invention, therefore, provides a method of converting a railcar. Specifically, the method entails converting a railcar having a sliding door to a railcar having a plug door. Further, the present invention provides a method of converting a railcar thereby giving the railcar added height and, consequently, added storage volume. Moreover, the method overcomes the deficiencies as noted above.

SUMMARY OF THE INVENTION

The present invention relates to a method of converting a railcar. More specifically, the invention provides a method of converting a railcar having a sliding door that may be used to cover an entry or an opening in a railcar having a plug door that may create an effective seal around a perimeter of the railcar. Further, the present invention provides a method of converting a railcar to add height and, therefore, storage volume to the railcar.

Therefore, in an embodiment of the present invention, a method of converting a railcar from having a sliding door to having a plug door is provided. The method comprises the steps of: providing a railcar having a sliding door disposed on top and bottom tracks for covering a door opening wherein the top and bottom tracks are connected to a side of the railcar; removing the sliding door; removing the top and bottom sliding door tracks; removing material from the box car that would interfere with the proper operation of a plug door disposed on the railcar for covering the door opening; providing door posts disposed on opposite sides of the door opening wherein the front surfaces of the door posts provide a sealing surface for the plug door; and installing top and bottom tracks for engaging with a plug door.

In an embodiment of the present invention, the method further comprises the steps of: providing a perimeter around the door opening; and installing a top and a bottom sealing surface around the perimeter of the door opening wherein the surface of the top and the bottom sealing surfaces are coplanar with the front surfaces of the door posts.

In an embodiment of the present invention, the method further comprises the steps of: providing a perimeter around the door opening; providing a sliding door sealing surface at the bottom of the perimeter of the door opening; removing the sliding door sealing surface at the bottom of the perimeter of the door opening; and adding a plug door sealing surface at the location where the sliding door sealing surface was removed from the bottom of the perimeter of the door opening wherein the plug door sealing surface is coplanar with the front surfaces of the door posts.

In an embodiment of the present invention, the top track is installed to the box car prior to installing the bottom track.

In an embodiment of the present invention, the method further comprises the step of cleaning the box car prior to installing the plug door.

In an embodiment of the present invention, the method further comprises the steps of: providing front and rear sliding door stops on the side of the railcar; and removing the front and rear sliding door stops prior to installing the plug door.

In an embodiment of the present invention, the sealing surface is disposed around the perimeter of the door opening and further wherein the sealing surface is coplanar around the perimeter of the door opening.

In an embodiment of the present invention, the method further comprises the steps of: cutting around the perimeter of the box car; removing the roof of the box car; providing a top plate above the door opening wherein the pre-existing top track is disposed on the top plate; removing the top plate by cutting the top plate wherein the cut-line is flush with the inside surfaces of the door posts; adding extensions around the perimeter of the box car where the roof was removed; and attaching a second roof to the extensions.

In an embodiment of the present invention, the second roof is the same as the roof that was removed from the box car.

In an embodiment of the present invention, the method further comprises the step of bracing the side walls and the floor of the box car when removing the roof of the box car.

In an embodiment of the present invention, the method further comprises the step of grinding the welding slag to provide smooth metal surfaces.

In an embodiment of the present invention, the method further comprises the step of attaching door post extensions to the door posts wherein the door post extensions provide a coplanar sealing surface with the door posts.

In an embodiment of the present invention, the method further comprises the step of repairing damage to the door posts prior to adding the extensions to the box car.

In an embodiment of the present invention, the extensions comprise door post extensions, side post extensions, side plate extensions and end plate extensions.

In an embodiment of the present invention, the method further comprises the steps of: attaching a plug door to the top track and the bottom track for sliding within the top track and on the bottom track wherein the plug door translates towards the railcar to cover the door opening; providing a sealing surface on the plug door; and engaging the sealing surface of the plug door to the sealing surfaces of the door posts.

In an alternate embodiment of the present invention, a method of building a railcar is provided comprising the steps of: providing a railcar having a plurality of sidewalls, a floor, a roof wherein the railcar is situated on a plurality of trucks for rolling on a rail; attaching a pair of vertical, parallel door posts to the railcar wherein the door posts define a door opening contained therebetween and further wherein the door posts are attached to the sidewall and further wherein the outer surface of the door posts provide a sealing surface to engage a plug door wherein the sealing surface of the door posts are coplanar with respect to each other; constructing a door header across a top of the door posts; attaching a top door track on the door header that runs across a top of the door posts and further extending away from the door opening wherein the top door track extending away from the door opening is attached to the sidewall; attaching a top sealing surface on the door header at the top of the door opening; attaching a bottom door track across the bottom of the door opening and extending away from the door opening attached to the sidewall; and attaching a bottom sealing surface across the bottom of the door opening.

In an embodiment of the present invention, the top sealing surface and the bottom sealing surface are coplanar with respect to each other.

In an embodiment of the present invention, the top sealing surface, the bottom sealing surface and the sealing surfaces contained on the door posts are coplanar with respect to each other.

In an embodiment of the present invention, the method further comprises the step of attaching a top track extension between the door header and the top track.

In an embodiment of the present invention, the method further comprises the step of attaching a bottom track extension between the sidewall of the railcar and the bottom track for holding the bottom track at a distance away from the sidewall of the railcar.

In an embodiment of the present invention, the method further comprises: attaching a plug door within the top track and on the bottom track for sliding longitudinally across the top track and the bottom track and further wherein the plug door translates towards the railcar; providing a sealing surface on the plug door; and engaging the sealing surface of the plug door to the sealing surfaces of the door posts.

It is, therefore, an advantage of the present invention to provide a method of converting a railcar that uses existing railcars to create railcars having the desired characteristics. Moreover, it is an advantage to provide a method of converting a railcar that re-uses most of the existing parts of the railcar.

Further, it is an advantage of the present invention to provide a method of converting a railcar that creates a sealing surface to receive a plug door on the railcar. Moreover, it is an advantage of the present invention to provide a method of converting a railcar that replaces existing structure on the railcars quickly and efficiently when creating the sealing surface for the plug door. In addition, it is an advantage of the present invention to provide a method of converting a railcar that allows goods, products and/or commodities to be stored and/or transported therein while remaining protected from damaging phenomena.

Moreover, it is an advantage of the present invention to provide a method of converting a railcar that provides a coplanar sealing surface around the perimeter of the door opening without decreasing the clear door opening or otherwise moving or modifying the door posts.

Still further, it is an advantage of the present invention to provide a method of converting a railcar whereby the roof of the railcar may be raised to provide an increased storage capacity of the railcar. Moreover, it is an advantage of the present invention to provide a method of converting a railcar that increases the door opening to allow larger commodities to be brought in or taken out of the railcar.

Moreover it is an advantage of the present invention to provide a method of building a railcar having a sealing surface provided on an outside surface of the door posts. In addition, an advantage of the present invention is having a sealing surface provided on a top and a bottom of the door opening. Moreover, it is an advantage to provide a sealing surface disposed around a perimeter of the door opening without adding a flange around the perimeter of the door opening for the plug door to seal against.

Additional features and advantages of the present invention are described in, and will be apparent from, the detailed description of the present preferred embodiments and from the drawings.

DETAILED DESCRIPTION OF THE PRESENTLY PREFERRED EMBODIMENTS

The present invention relates to a method of converting a box car. More specifically, the method includes steps for removing a sliding door that covers an opening within the box car. Moreover, the steps of the present invention including removing the door stops, tracks and other equipment used to hold the sliding door on the box car. Moreover, the present invention includes steps for modifying the perimeter of the door opening of the box car for receiving a plug-type door. Moreover, the present invention relates to a method for increasing the storage capacity of the box car by removing the roof and increasing the height of the box car.

Figure 1:
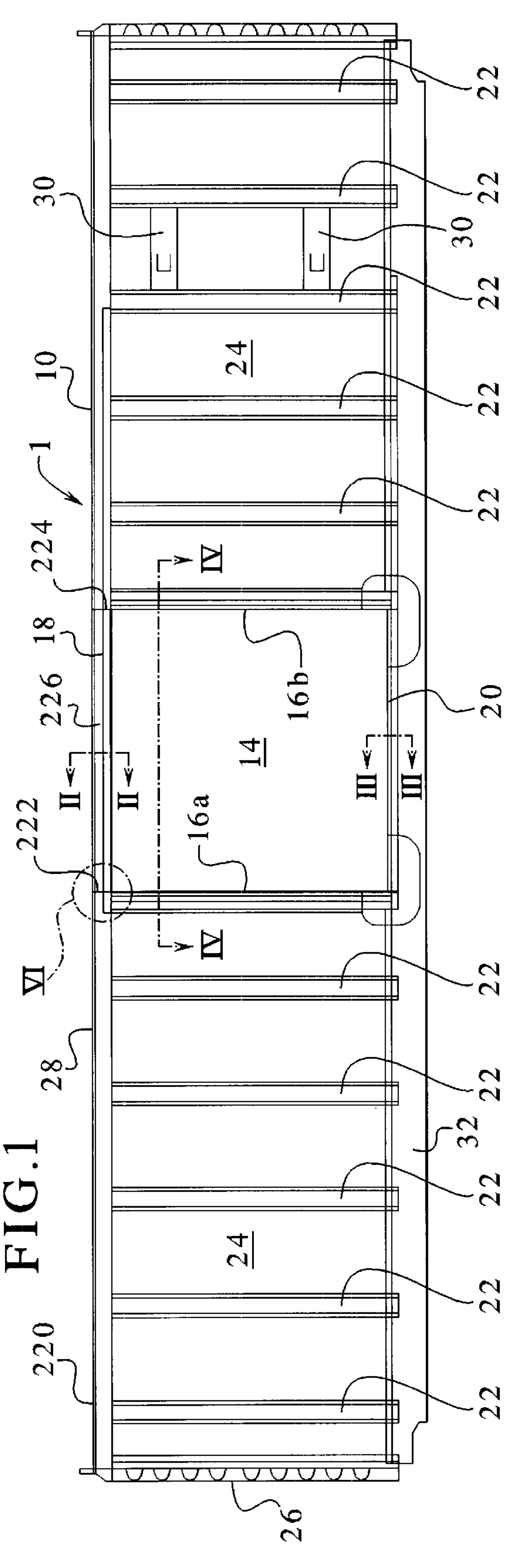
FIG. 1 illustrates a plan view of a box car showing a clear door opening and door stops, in an embodiment of the present invention.

Referring now to the drawings, wherein like numerals refer to like parts, FIG. 1 illustrates a box car 1 having equipment thereon for holding a sliding door and allowing a sliding door to slide longitudinally along a set of tracks to cover a door opening. Specifically, the box car 1 may include a top track 10 and a bottom track 12 for receiving a sliding door that may slide along the top track 10 and the bottom track 12 to close over a door opening 14. The door opening 14 may be defined as an open area within door posts 16*a*, 16*b* a top threshold 18, and a bottom sill 20.

The box car 1 may further have a plurality of sideposts 22 that may be utilized to support a side plate 24 that may cover most of the side of the box car 1, except for the door opening 14. The box car 1 may further include ends 26 that may be composed of corrugated steel for structural strength. However, the ends 26 may be composed of any material that may be apparent to one having ordinary skill in the art. In addition, the box car 1 may include a roof 28 that may provide a covering for the box car 1. Still further, the box car 1 may include a bottom plate 32 that may be disposed on a bottom of the box car 1 and may allow trucks (not shown) to be disposed on the box car 1, including wheels (not shown) for engaging a set of tracks (not shown) to allow the box car 1 to be moved along the set of tracks.

The box car 1 may further include backstops 30 that may be disposed on the sideplate 24 of the box car 1 to stop the sliding door that may be disposed on the top track 10 and the bottom track 12. Any number of backstops 30 may be disposed on the box car 1 as may be apparent to one having ordinary skill in the art.

Figure 2:
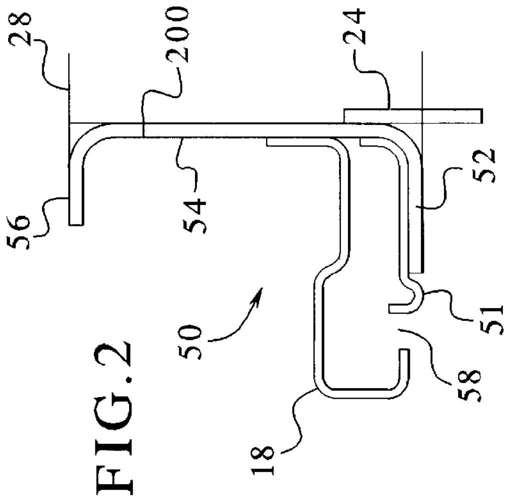
FIG. 2 illustrates a cross-sectional view of the box car of FIG. 1 along the line of II—II showing the top track, in an embodiment of the present invention.

FIG. 2 illustrates a cross-section 50 of the box car 1 along line II—II, of the top track 18 including a door header 51 that may be disposed on a top sill 52 and a top plate 54, which may be an extension of the side plate 24. The top plate 54 may include a roof sill 56 that may allow the roof 28 to be disposed thereon. Further, the top track 18 and the door header 51 may be typically welded to the top sill 52 and the top plate 54. Moreover, the top sill 52 and the top plate 54 may be welded to the side plate 24 forming an extension of the side plate 24. The top track 18 may allow a wheel or other protrusion on the sliding door to be engaged therein through an opening 58 between the top track 18 and the door header 51. The sliding door may slide back and forth within the top track and may be kept from hitting the top sill 52 by the door header 51. Generally, the top track 18 and the door header 51 may keep the sliding door in an upright position.

Figure 3:
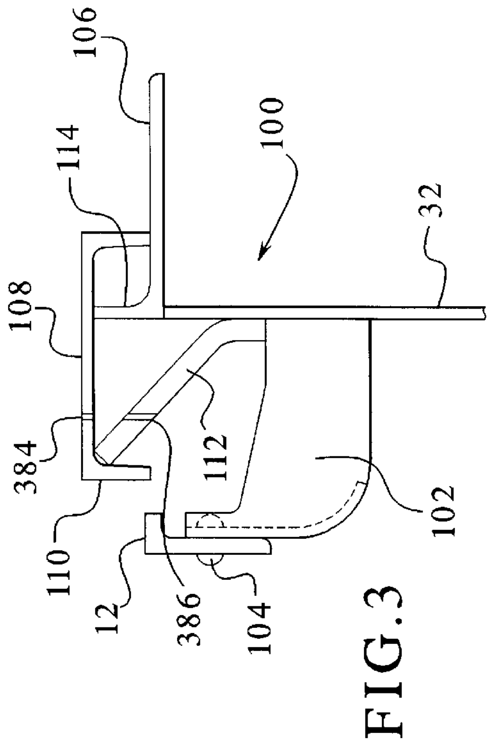
FIG. 3 illustrates a cross-sectional view of the box car of FIG. 1 along the line of III—III showing the bottom sill and track, in an embodiment of the present invention.

FIG. 3 illustrates a further cross-section 100 of the box car 1 long line III—III, including the bottom track 12 that may allow wheels disposed on the sliding door to be disposed thereon thereby allowing the sliding door to slide back and forth longitudinally on the bottom track 12. The bottom track 12 may be attached to a bottom track support 102 via a bolt 104, or via any other attaching means apparent to one having ordinary skill in the art. The bottom track support 102 may be further attached to the bottom plate and may run along a length of the bottom plate sufficient to provide a length for the sliding door to open and close.

Further, the box car 1 may include a floor 106 that may extend within the interior space of the box car 1. Connected to the floor 106 may be a bottom sill 108 having a downturned flange 110. The downturned flange 110 may provide a surface for the sliding door to abut, thereby providing a loose seal between the sliding door and the downturned flange 110. Moreover, the bottom sill 108 and the downturned flange 110 may be supported by a downturned flange support 112 and a bottom sill support 114.

Figure 4:
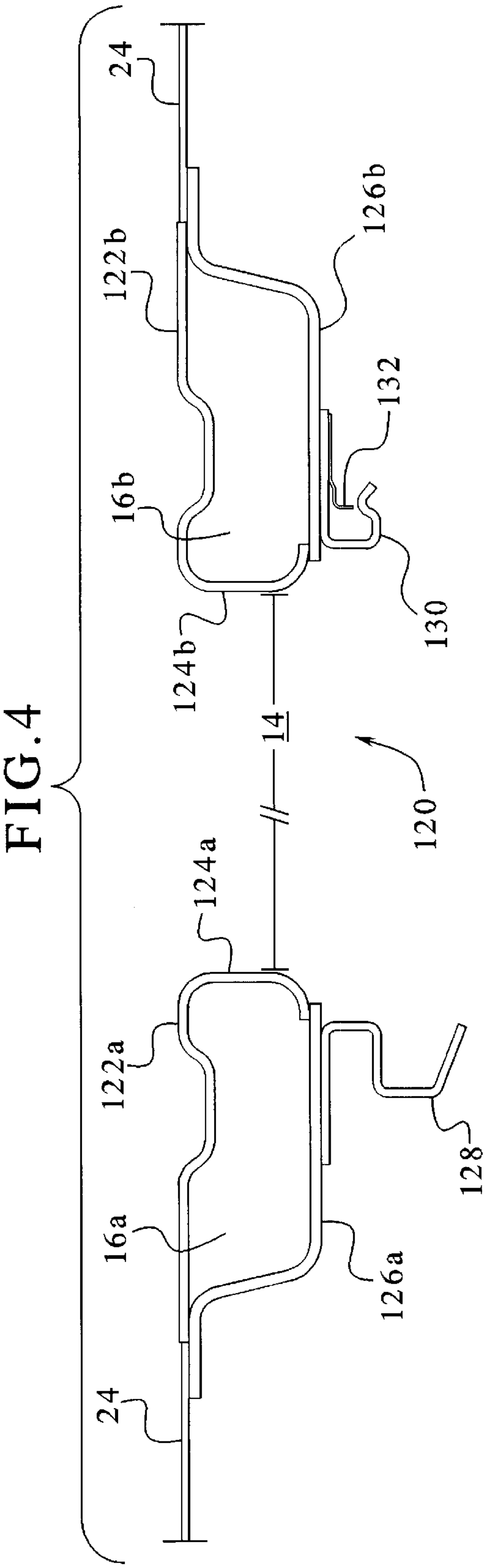
FIG. 4 illustrates a cross-sectional view of the box car of FIG. 1 along the line of IV—IV showing the door posts, front door stop, spark strip and baffle plate, in an embodiment of the present invention.

FIG. 4 illustrates a further cross-section 120 of the box car 1 along the line IV—IV, including door posts 16*a*, 16*b* that may be attached to the side plate 24. The door posts 16*a*,16*b* may comprise tubular, hollow members having back sides 122*a*,122*b*, interior sides 124*a*, 124*b*, and front sides 126*a*, 126*b*, respectively. Although the cross-section of the door posts 16*a*, 16*b* is shown to be rectangular, the door posts may be any shaped apparent to one having ordinary skill in the art, including, for example, cylindrical or square. Moreover, the door posts 16*a*,16*b* may not be hollow, but may be filled with material such as, for example, to add strength to the door posts 16*a*,16*b*. The door posts 16*a*,16*b* may define a width of the door opening 14. Moreover, disposed on the door post 16*a* may be a front stop 128 that may provide a surface for the sliding door to engage thereby restricting the movement of the sliding door longitudinally along the top track 18 and the bottom track 12. In addition, disposed on the door post 16*b* may be a baffle plate 130 and a spark strip 132 that may engage a protrusion from the sliding door. Both the front stop 128 and the baffle plate 130 may provide a loose sealing surface for the sliding door to restrict openings between the sliding door and the box car 1 thereby keeping things from entering the box car 1 and also keeping things within the box car 1. The spark strip may restrict the movement of the sliding door toward the box car 1.

Figure 18:
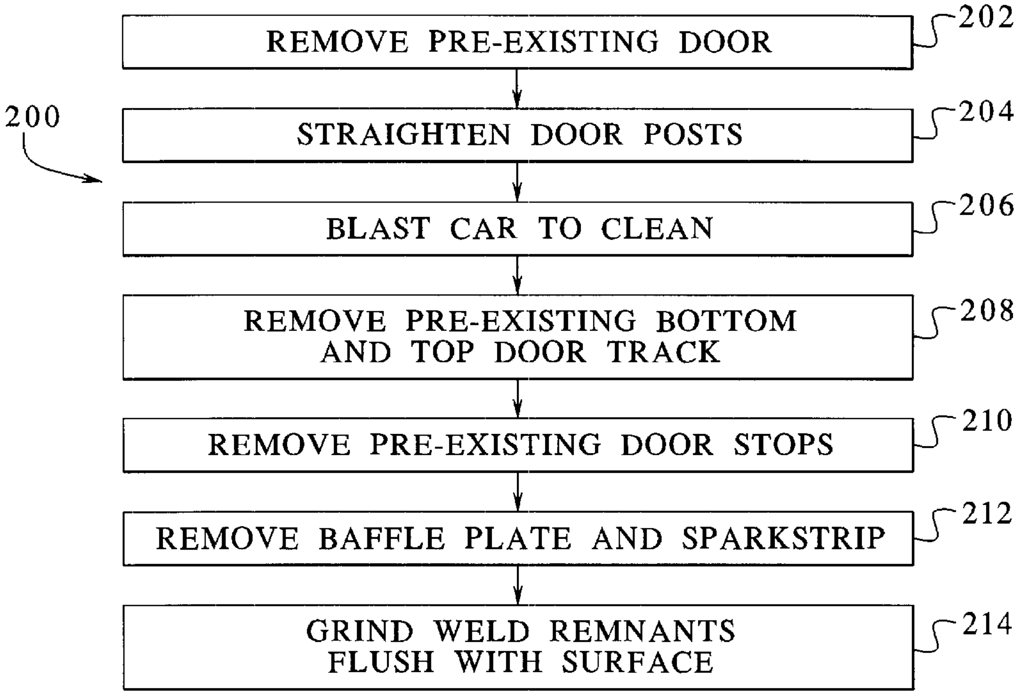
FIG. 18 illustrates a method of preparing a box car for being converted from a sliding door to a plug door, in an embodiment of the present invention.

Referring now to FIG. 18, a method 200 is shown for preparing the box car 1 for being converting from having a sliding door to having a plug door. The method 200 may comprise a step 202 for removing the pre-existing door. This involves removing the sliding door from the top track 18 and the bottom track 12. Next, the door posts 16*a*,16*b* may be straightened via step 204. Typically, the door posts 16*a*,16*b* may be damaged. This may be caused by a plurality of factors, including, for example, forklifts that may be utilized to move pallets into and out of the box car 1. The forklifts may bang into the door posts 16*a*,16*b* thereby causing dents or otherwise warping the door posts 16*a*,16*b*. The door posts 16*a*,16*b* may be straightened with any tool that may be apparent to one having ordinary skill in the art.

The box car 1 may then be cleaned via step 206. Typically, the box car 1 may be blasted with sand, grit, water, or any other material that may be utilized to scour the interior and the exterior of the box car 1 thereby cleaning the interior of the box car. Moreover, the box car 1 may be cleaned via any method or technique apparent to one having ordinary skill in the art.

Next, the top track 18 and the bottom track 12 may be removed via step 208. Moreover, the bottom track support 102 may be removed at the same time as the bottom track. It should be noted that each of the pieces that may be removed from the box car 1 may be removed via a metal cutting tool, such as, for example, a plasma arc or an air arc, that may cut the metal and/or remove places where the metal had been welded. Moreover, each of the pieces that may be added to the box car when converting the box car from having a sliding door to having a plug door, or removing and raising the roof, may be mechanically attached via any method and using any tool apparent to one having ordinary skill in the art. Preferably, the addition of the materials to the box car 1 will be done via a welding tool.

After the top track 18 and the bottom track 12 have been removed from the box car 1, the door stops may be removed via step 210. More specifically, the back door stops 30 and the front door stop 128 may be removed via step 210. Again, the door stops may be removed using a welding tool to remove weld that holds the door stops in place. However, any tool may be utilized to remove the door stops, or any other equipment from the box car as may be apparent to one having ordinary skill in the art. Next, the baffle plate 130 and the spark strip 132 may be removed via step 212 in the same manner as described above with respect to the other equipment that is removed from the box car 1.

After each of the pieces is removed from the box car 1, residual weld and spatter may be ground away via a grinding tool, as may be apparent to those having ordinary skill in the art via step 214. Moreover, other equipment may be removed from the box car 1 if the other equipment contained on the box car 1 may interfere with the proper working of the plug door that is added to the box car 1. The areas having weld remnants and spatter should be ground until the metal is smooth and unlikely to cause difficulty in the proper movement of the plug door, and for personal safety reasons.

Figure 16:
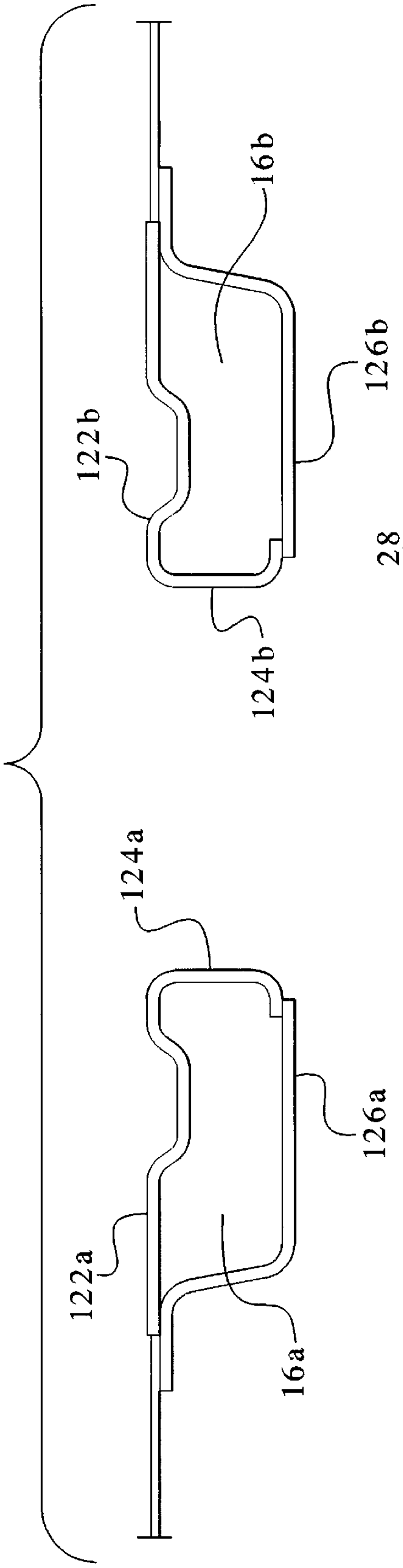
FIG. 16 illustrates a cross-sectional view of door posts and a sealing surface for a plug door disposed on the outer surface of the door posts, in an embodiment of the present invention.

FIG. 16 illustrates a cross-sectional view of the door posts wherein the front door stop 128, the baffle plate 130 and the spark strip 132 are removed. The front surfaces 126*a*,126*b*, disposed on an outside surface of the door posts 16*a*,16*b*, may be ground smooth to present a sealing surface for a plug door to be disposed on when the plug door is closed over the door opening 14. The front surfaces 126*a*,126*b* may be coplanar with respect to each other. However, it should be realized that the front surfaces 126*a*,126*b* may be coplanar or not coplanar, depending on how the complementary surfaces on the plug door may line up with the front surfaces 126a,126b. For example, if the sealing surface on the plug door is angled, then the front surfaces 126a,126b may also be angled to receive the sealing surfaces of the plug door.

Figure 6:
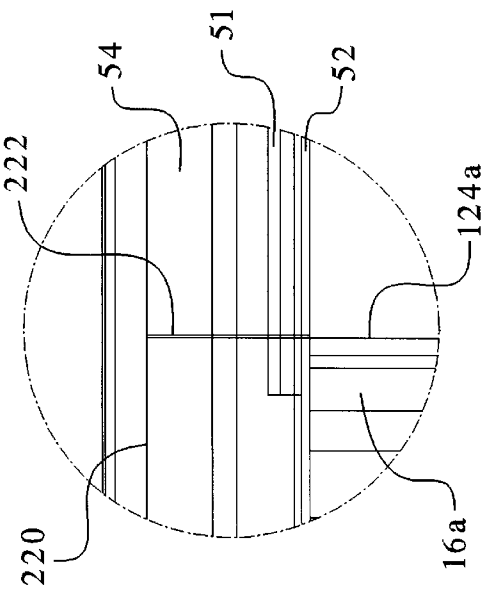
FIG. 6 illustrates a plan view of a door post, top track and top threshold in a detail VI of the box car of FIG. 1, in an embodiment of the present invention.
Figure 5:
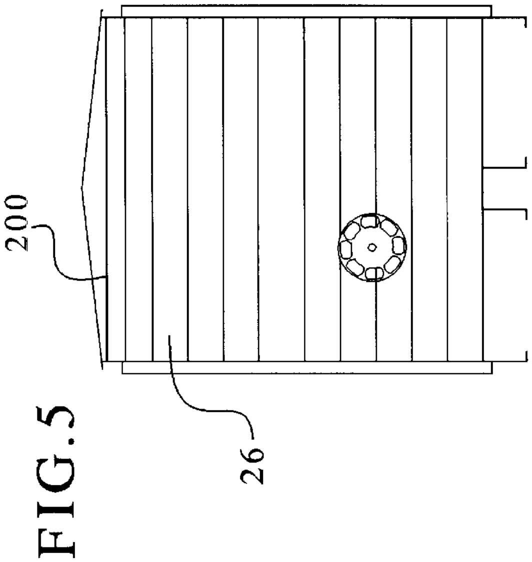
FIG. 5 illustrates an end view of the box car, in an embodiment of the present invention.

After the box car 1 is prepared to be converted from having a sliding door to having a plug door, the box car 1 may optionally be prepared so that the roof may be raised so as to provide greater storage capacity within the box car 1 and further to provide a larger door opening. Accordingly, a burn line may be cut into the box car 1 via an air arc or other type of welding or metal cutting tool. FIG. 1 shows a bum line 220 that may be cut around the perimeter at the top of the box car. Specifically, the burn line 220 may be cut into the top plate 54 so as to remove the roof sill 56 and the roof 28 from the remainder of the box car 1. FIG. 2 shows the bum line 220 as cut into in the top plate 54. Moreover, the bum line may continue to the ends 26 of the box car 1, as shown in FIG. 5. In addition, bum lines 222,224 may be cut into the door header 51 and the top plate 54 that may be disposed above the door opening 14. More specifically, the bum lines 222,224 may be cut into the door header 51, the top sill 52 and the top plate 54 so as to provide a cut into the door header 51, the top sill 52 and the top plate 54 that is flush with the inside surfaces 124a,124b of the door posts 16a,16b. FIG. 6, showing a close-up of detail VI from the box car 1 of FIG. 1, illustrates the burn line 222 that may be cut into the door header 51, the top sill 52 and the top plate 54 so as to provide a cut into the door header 226 that is flush with the inside surface 124a of the door post 16a. A similar burn line 224 may be cut into the door header 51, the top sill 52 and the top plate 54 so as to provide a flush surface that aligns with the inside surface of the door post 16b of the box car 1. Each of the cuts may be ground smooth using a grinding tool.

Figure 19:
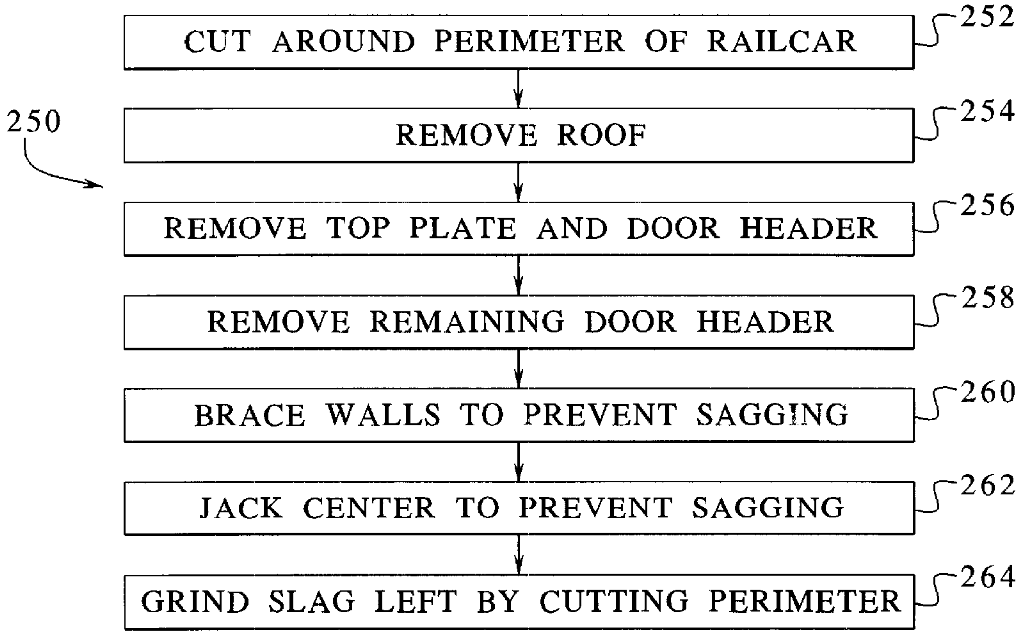
FIG. 19 illustrates a method of cutting the perimeter of the box car and removing the roof of the box car, in an embodiment of the present invention.

Referring now to FIG. 19, a method 250 of removing the roof of the box car 1 is illustrated. Specifically, the method 250 may include a step 252 for cutting around the perimeter of the box car 1, as noted above. After cutting around the perimeter of the box car 1, the roof may be removed, including a piece of the top plate 54 and the top sill 56 via step 254. Generally, the roof 28 may be removed via a crane and set to the side, modified, or discarded. Next, the burn lines 222 and 224 may be cut into the box car 1, wherein a section of the door header 51, the top sill 52 and the top plate 54 may be removed via step 256. After the section of the door header 51, the top sill 52 and the top plate 54 are removed from the box car 1, the remaining sections of the door header may be removed from the box car 1 outside of the door opening 14 via step 258. The side walls, comprising the side plate 24, and the floor 106 of the box car 1 may be braced via steps 260 and 262, respectively, to provide support for the walls and the floor while the roof and the door header 51, the top sill 52 and the top plate 54 are removed from over the door opening 14. The slag remaining after equipment has been removed and the lines have been cut may be ground away via a grinding tool pursuant to step 264.

Figure 20:
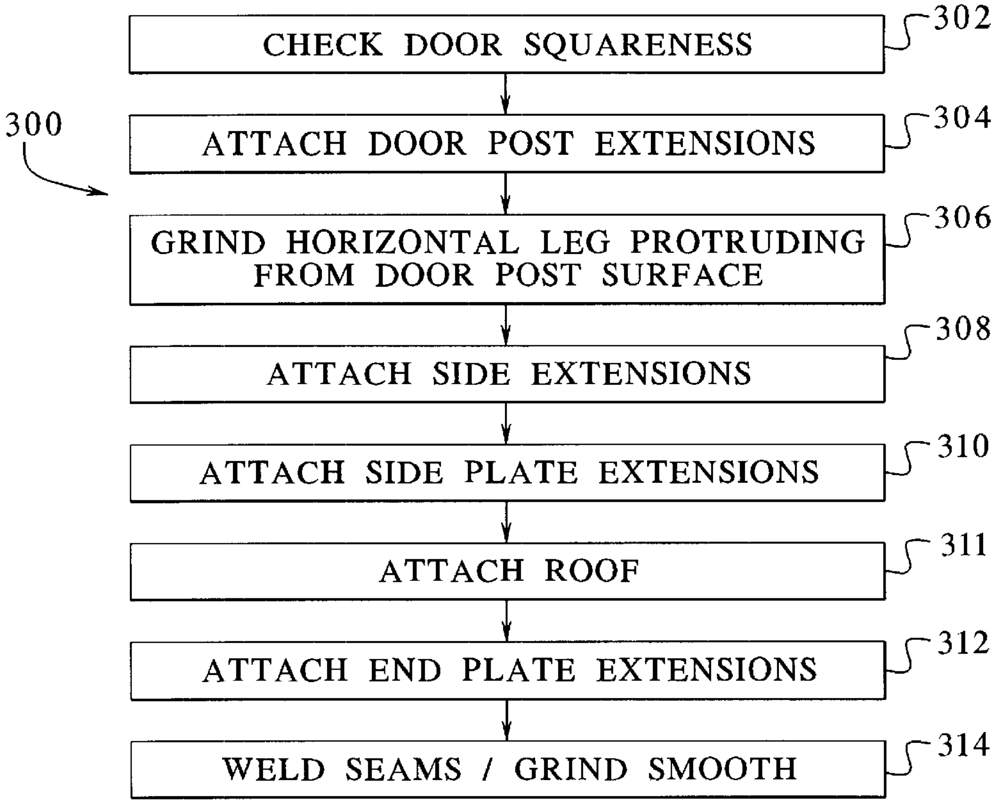
FIG. 20 illustrates a method of converting a box car from having a sliding door to one having a plug door, in an embodiment of the present invention.

After the perimeter has been cut and the roof 28 has been removed pursuant to the method described in FIG. 19, extensions may be added and the new roof may be added to the extensions pursuant to a method 300, as shown in FIG. 20. After the roof has been removed and the door header 51, the top sill 52 and the top plate 54 have been removed from above the doorway 14, the squareness of the door posts 16a,16b may be examined and fixed, if necessary, via step 302. As noted above, the door posts 16a,16b may be damaged from having equipment, such as, for example, forklifts, crashing or bumping into the door posts 16a,16b.

Figure 7:
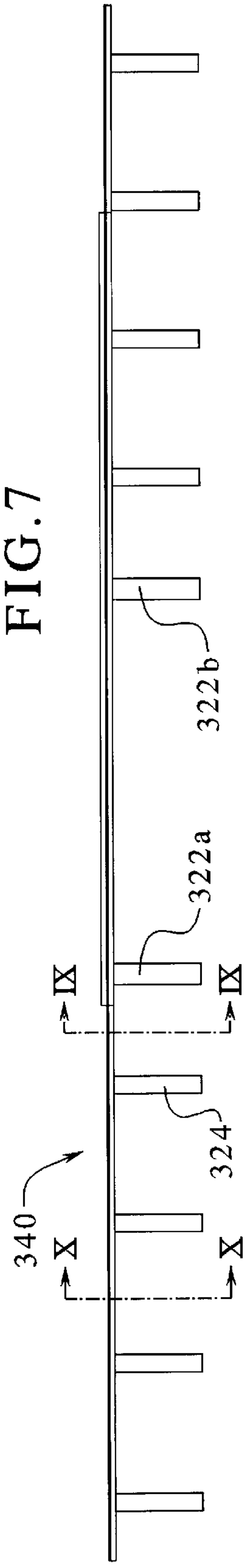
FIG. 7 illustrates a plan view of door post extensions, side post extensions, side plate extensions and a top track that may be added to a box car, in an embodiment of the present invention.
Figure 8:
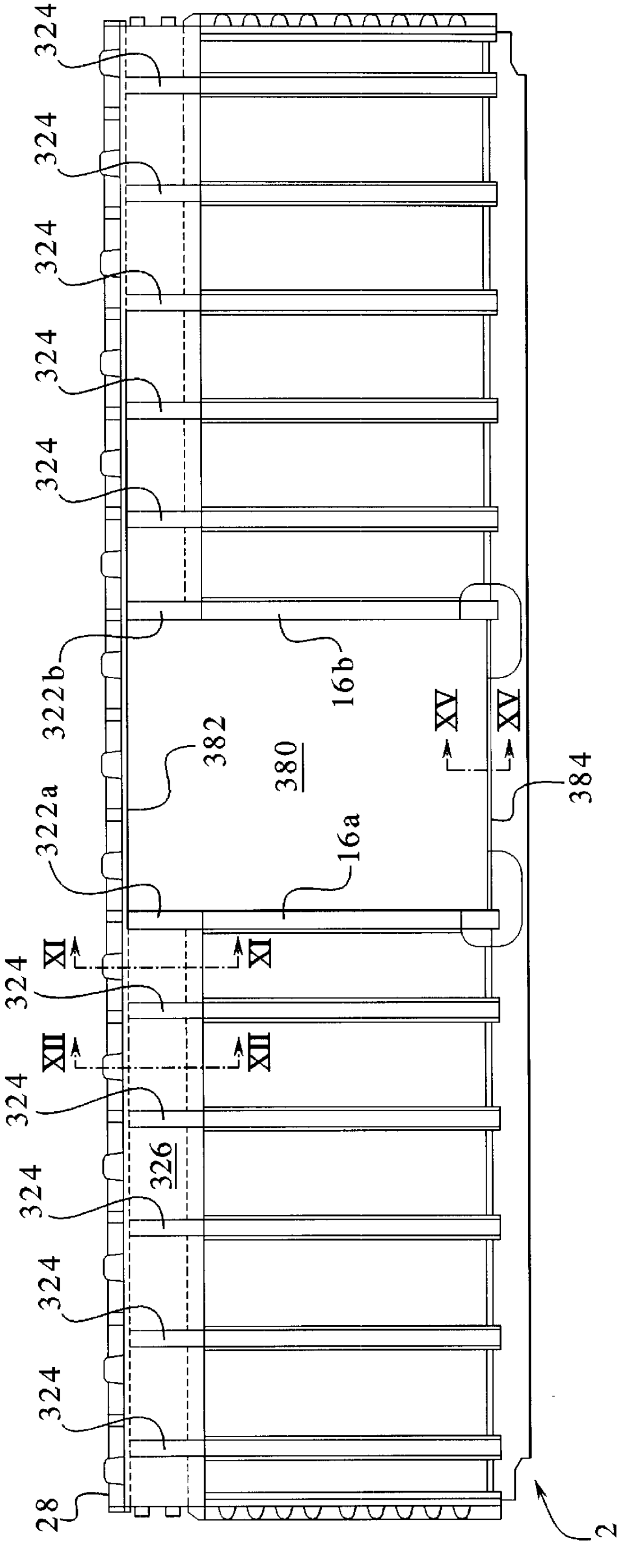
FIG. 8 illustrates a plan view of a box car having the door post extensions, side post extensions, and top track added to the box car, in an embodiment of the present invention.
Figure 9:
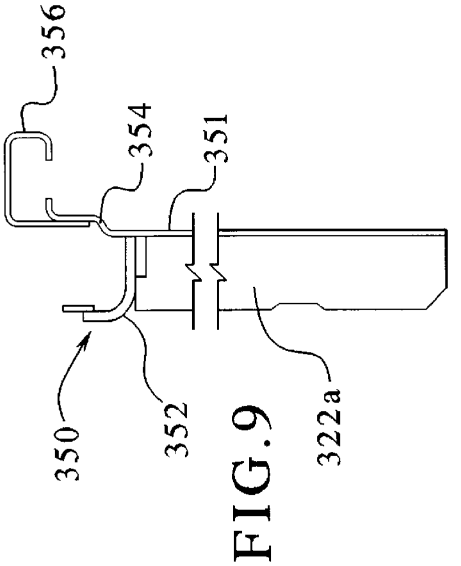
FIG. 9 illustrates a cross sectional view of the box car of FIG. 9 along the line IX—IX showing the door post extension and top track that may be added to the box car, in an embodiment of the present invention.
Figure 11:
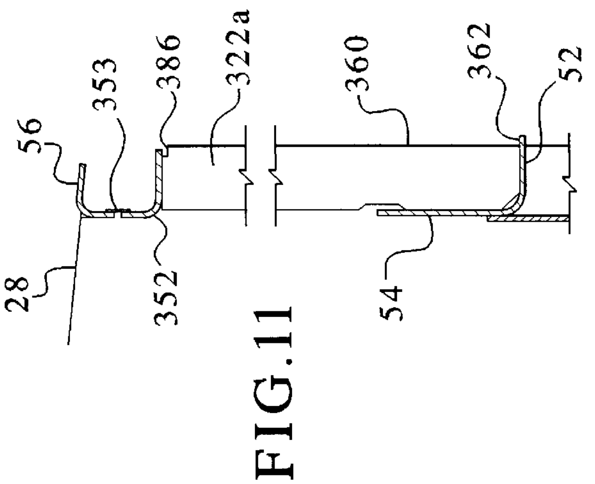
FIG. 11 illustrates a cross sectional view of the box car of FIG. 10 along the line XI—XI showing the door post extension and top track added to the box car, in an embodiment of the present invention.

Thereafter, door post extensions 322a,322b, illustrated in FIG. 7, may be added to the door posts 16a,16b, respectively, as shown in FIG. 8, via step 304. Further, FIG. 9 illustrates a cross-section 350 along line IX—IX of FIG. 7, showing a cross-section of the door post extension 322a. Moreover, the door post extensions 322a,322b may have an alternate top sill 352 added thereon and may further have a top track extension 354 to attach a plug door top track 356 thereto. The door post extensions 322a,322b may be welded to the door posts 16a, 16b respectively, as illustrated in FIG. 11, which is a cross-section view of the door post extension 322a taken along line XI—XI of FIG. 8. As shown in FIG. 11, the door post extension 322a may be welded to the top sill 52 and the top extension 54 in an upright position so that the front surface 360 of the door post extension 322a is coplanar with the front surface 126a of the door post 16a. A horizontal leg portion 362 of the top sill 52 that may protrude from between the door post extension 322a and the door post 16a may be ground away so that the entire front surface combining the door post extension 322a and the door post 16a may be coplanar. The horizontal leg portion 362 may be ground off via step 306.

Figure 10:
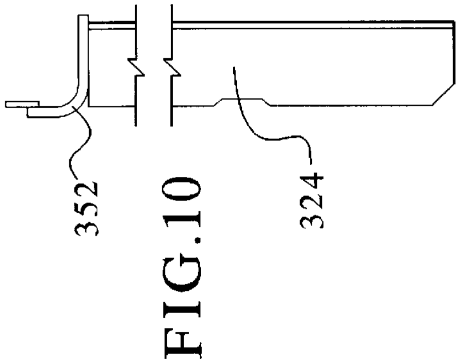
FIG. 10 illustrates a cross sectional view of the box car of FIG. 9 along the line X—X showing the side post extensions and reinforcement bar that may be added to the box car, in an embodiment of the present invention.
Figure 12:
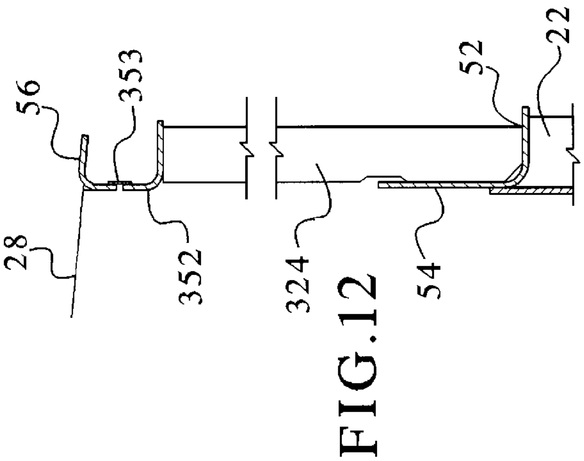
FIG. 12 illustrates a cross-sectional view of the box car of FIG. 10 along the line XII—XII showing the side post extension and reinforcement bar added to the box car, in an embodiment of the present invention.

Side post extensions 324 may be attached to the side posts 22 via step 308. FIG. 10 illustrates a cross-section of one of the side post extension 324 that may be attached to one of the side posts 22. FIG. 10 illustrates a cross section of the side post extension 324 taken along line X—X of the extension apparatus 340 of FIG. 7. The side post extension 324 may have the alternate top sill 352 attached thereto. FIG. 12 illustrates one of the side post extensions 324 welded to the side post 22, in a cross-section taken along line XII—XII, of the modified box car 2 of FIG. 8. The side post extensions 324 may be welded to the top sill 52 and the top extension 54, as shown in FIG. 12. A side plate extension 326 may then be welded to the side post extensions 322 and the side plate 24 to enclose the top via step 310.

The roof 28 may then be attached, as shown in FIG. 8, via step 311. The roof sill 56 may be welded to the alternate top sill 352, as shown in FIGS. 11 and 12, and further may be reinforced by a reinforcing bar 353. The roof 28 may be the same roof that had been cut from the box car 1 in FIG. 1. However, a new roof may be attached to the top of the box car, as may be apparent to one having ordinary skill in the art.

Figure 13:
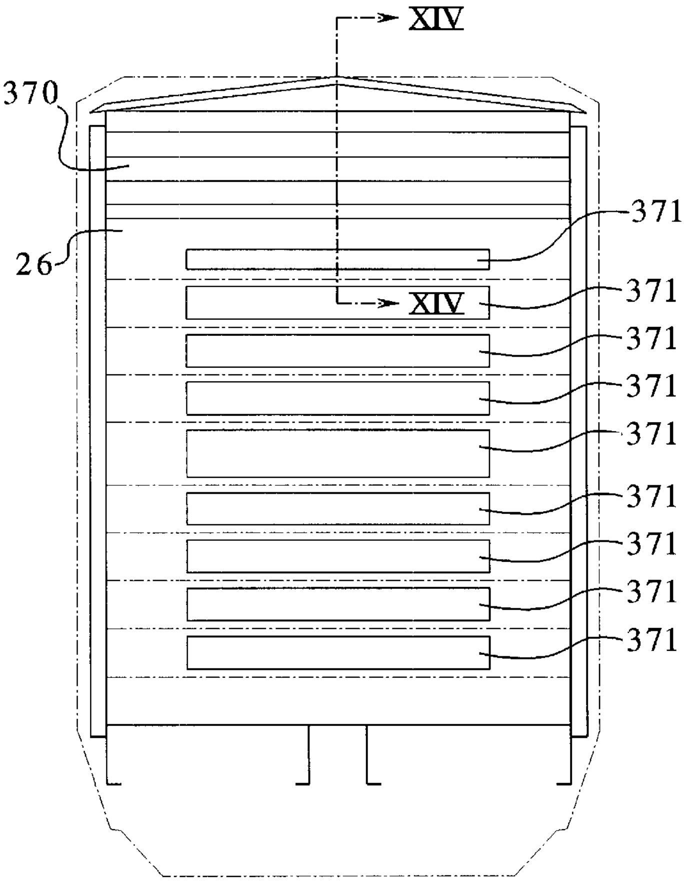
FIG. 13 illustrates an end view of a modified box car in an embodiment of the present invention having an end plate extension and reinforcement plates, in an embodiment of the present invention.

Next, an end plate extension 370 may be attached by welding the end plate extension 370 to the end 26, as shown in FIG. 13 via step 312, as shown in FIG. 9. The end plate extension 370 may be constructed of corrugated steel to provide strength and durability to the end plate extension 370. However, it should be noted that any material may be used as may be apparent to one having ordinary skill in the art. The end plate extension 370 may be welded to the end 26 at a weld point 372. Moreover, the ends 26 may have reinforcement plates 371 welded or otherwise mechanically attached thereto to provide greater support to the ends 26.

After the door post extensions 322a,322b, the side post extensions 324, the side plate extension 326, and the end plate extension 370 have been welded, as shown in FIG. 8 of a modified box car 2, the seams may be welded together, and all corners, weld spatter, protruding elements, and any other undesirable piece of metal, may be ground away from the modified box car 2 to provide a smooth metal surface. By creating the modified box car 2, a new door opening 380 would be created having a larger clear door opening than the box car 1. However, the new door opening would still be defined by the inner surfaces 124*a*,124*b* of the door posts 16*a*,16*b*. However, the height of the door opening 380 would be larger due to the removal of a section of the top plate 54. Therefore, the height of the door opening 380 would be defined by the bottom sill 108 and the alternate top sill 352.

It should be noted that the above-described method for removing the roof 28 and attaching door post extensions 322*a*,322*b*, side post extensions 324, a side plate extension 326, and end plate extensions 370 may be entirely optional, and is not required to modify the box car from having a sliding door to a plug door. If removal of the roof is not required, then after preparing the box car 1 for converting from a sliding door to a plug door via the method 200 of FIG. 19, the following method may be utilized for installing a plug door to the box car 1.

Figure 21:
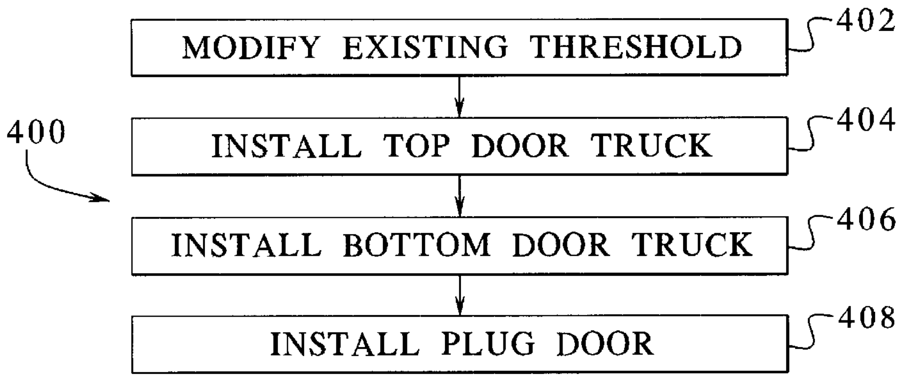
FIG. 21 illustrates a method of attaching the plug door to the box car, in an embodiment of the present invention.

Referring now to FIG. 21, a method 400 is illustrated for installing a plug door to the box car. The existing door perimeter may be modified via step 402 to provide a sealing surface for the plug door around the perimeter of the door opening 14 of the box car 1 or the modified door opening 380 of the modified box car 2, depending on whether the roof has been raised. In a preferred embodiment of the present invention, the entire sealing surface around the perimeter of the door opening 14 or 380 door may be coplanar. Therefore, a top sealing surface 351 may be added to the new top sill 352 to provide a top sealing surface 382 running along the top of the perimeter of the door opening 14 or 380, as shown in FIG. 9. The top sealing surface 351 may be coplanar with the front surfaces 126*a*,126*b* of the door posts 16*a*,16*b*.

Figure 15:
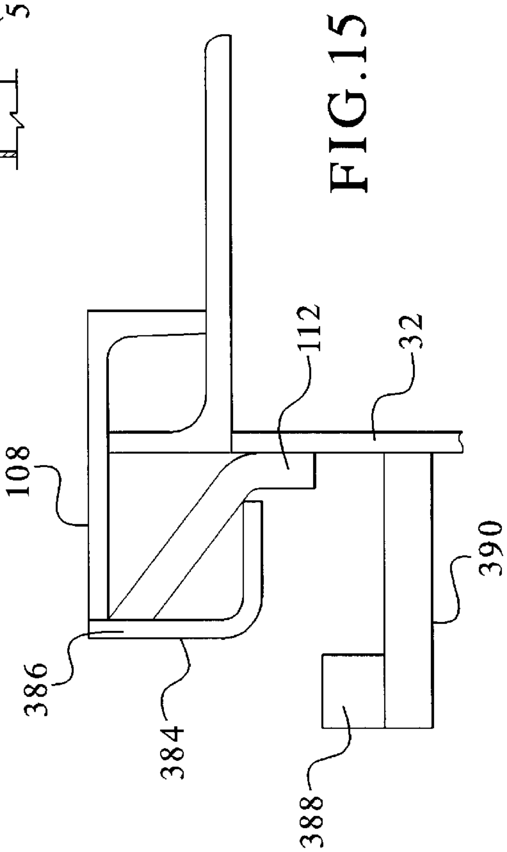
FIG. 15 illustrates a cross section view of a modified bottom sill, having a modified sealing surface, and a bottom track that may be added for the plug door, in an embodiment of the present invention
Figure 14:
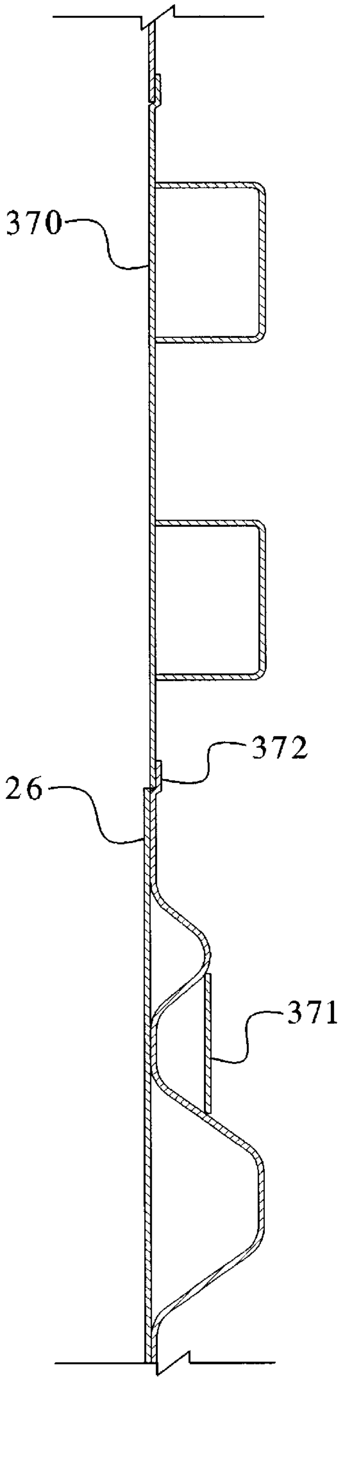
FIG. 14 illustrates a cross-sectional view of the box car of FIG. 13 along the line XIV—XIV showing an end plate extension and reinforcement plates, in an embodiment of the present invention.

In addition, a bottom sealing surface 384, as shown in FIG. 15, may be constructed from the bottom sill 108 and the downturned flange support 112, as shown in FIG. 3. FIG. 3 further shows a burn line 384 in the bottom sill 108 and a burn line 386 in the downturned flange support 112, allowing the downturned flange 110 to be removed. A bottom sealing surface 384 may be attached to where the bottom sill 108 and the downturned flange support 112 were cut by welding a flat piece of metal 386 onto the bottom sill 108 and the downturned flange support 112. The bottom sealing surface 384 may be coplanar with the top sealing surface 351 and the front surfaces 126*a*,126*b* of the door posts 16*a*, 16*b* to provide a coplanar sealing surface around the perimeter of the door opening 14 or 380.

Next, the plug door top track 356 may be installed via step 404, as shown in FIG. 9. The top track extension 354 may be welded to the alternate top sill 352 into a notch 386 provided in the side post extensions 322*a*,322*b* and in some of the side post extensions 324. The plug door top track 356 may then be welded to the top track extension 354. The plug door may slide within the plug door top track 356. It is important that the plug door top track 356 be installed prior to installing the plug door bottom track, as note below.

A plug door bottom track 388 may then be installed via step 406. To provide clearance for the plug door bottom track 388, a bottom track extension 390 may be welded to the bottom plate 32 for the bottom track 388 to rest thereupon. The plug door may then be installed onto the unmodified box car 1 or the modified box car 2 via step 408. The plug door bottom track 388 should be level and straight and should allow the plug door to be disposed thereon while also allowing the plug door to slide within the plug door top track 356. The plug door bottom track 388 may be attached to the bottom plate 32 in any manner as may be apparent to one having ordinary skill in the art. However, it is preferable that that the plug door bottom track 388 be dogged tightly to the bottom plate 388 while the bottom track extension 390 is being welded to the bottom plate 32.

Figure 17:
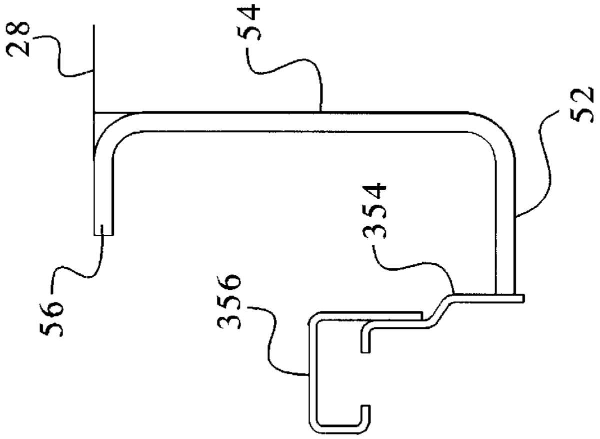
FIG. 17 illustrates a cross-sectional view of a plug door top track attached to a top sill, in an embodiment of the present invention.

If the roof 28 has not been cut from the box car 1, as detailed above, then the top track extension 354 and the plug door top track 356 may be attached via welding or any other method directly to the top sill 52, as shown in FIG. 17. This may be performed after the sliding door top track 18 and the door header 51 have been removed from the top sill 52. The plug door top track 356 may be positioned so that the plug door may roll or otherwise move freely within the plug door top track 356 while staying on the plug door bottom track 388, as shown in FIG. 15. Moreover, the plug door top track 356 may be positioned such that the plug door may freely engage the door post front surfaces 126*a*,126*b* and the top sealing surface 351 and the bottom sealing surface 384.

Although the aforementioned methods and Figures represent a preferred embodiment of the present invention, other features may be substituted for the features described above. Specifically, the sealing surface around the perimeter of the door opening 14 or 380 may not be coplanar, but may be angled to receive a plug door that may also have an angled sealing surface. Moreover, the sealing surface of the plug door may be round and may engage rounded door posts. Moreover, the plug door may not be tightly sealed against the sealing surface. Still further, a gasket is, preferably, provided on the sealing surface of the plug door. However, the gasket may be provided around the perimeter of the door opening 14 or 380 on the sealing surface, such as, for example, attached to the door posts 16*a*,16*b* and the top and bottom sealing surfaces. Still further, there may be no gasket contained on either the plug door or the sealing surface. In addition, although a gasket is preferred, there may be any other sealing mechanism provided on the plug door or sealing surface that will provide a seal when the plug door is translated into the door opening 14 or 380. In addition, the gasket or other sealing mechanism may not be provided around the entire perimeter of the door opening, but may only be provided around part of the perimeter. Still further, the plug door may not directly abut the door posts 16*a*,16*b*. The sealing surface disposed around the perimeter of the door opening 14 or 380 may be disposed on a piece of material that may then be attached to the door posts 16*a*,16*b*.

Moreover, the sealing surface described above to engage a plug door, wherein the sealing surface is disposed on an outside surface of the door posts, may be incorporated into the original construction of the railcar. For example, a box car that is being built from scratch may include the inventive features as described above. Specifically, the newly constructed box car may be constructed using methods that are generally known to exist in the art. However, the door posts may provide sealing surfaces on the front surfaces of the door posts for engaging the plug door. Moreover, the sealing surfaces on the front surfaces of the door post may be coplanar with respect to each other. Further, the sealing surfaces on the front surfaces of the door posts may be coplanar with each other, and with either or both of the top and/or bottom sealing surfaces, that each may be added to the box car during the construction of the box car.

Typically, a new box car may be constructed with side walls, a floor, and a roof, wherein the box car may be situated on a plurality of trucks with wheels for engaging and rolling on rails. Door posts may be built attached to one of the side walls for defining a door opening. The door posts may have the sealing surfaces as described above with respect to FIG. 16. Moreover, a door header may be constructed across the top of the door opening to provide support for the door and to allow a top sealing surface to be disposed on the door header. Further, a bottom sealing surface may be disposed on the bottom of the door opening. These sealing surfaces may be coplanar with respect to each other. However, having each sealing surface coplanar is not necessary for this invention.

The construction of the newly built box car should, at least, include the sealing surfaces on the outside surface of the door posts, as provided in FIG. 16. After the sealing surfaces are built onto the newly built box car, a top track may be added to the door header and a bottom track may be attached along a bottom of the door opening to provide a track for the plug door to slide thereon. The plug door may then be attached to the box car on the top and bottom track in a position so that the plug door may slide longitudinally along the top and bottom tracks and may also translate toward the box car to seal at the sealing surface on the door posts and/or on the top and bottom sealing surfaces.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method of converting a railcar from having a sliding door to having a plug door, the method comprising the steps of:

providing a railcar having a sliding door disposed on top and bottom tracks for covering a door opening wherein the top and bottom tracks are connected to a side of the railcar;

removing the sliding door;

removing the top and bottom tracks;

removing material from the railcar that would interfere with a proper operation of a plug door disposed on the railcar for covering the door opening;

providing door posts disposed on opposite sides of the door opening wherein the front surfaces of the door posts provide a sealing surface for the plug door; and installing top and bottom tracks for engaging with the plug door.

2. The method of claim 1 further comprising the steps of:

providing a perimeter around the door opening; and installing a top and a bottom sealing surface on the top and bottom, respectively of the door opening wherein the surfaces of the top and the bottom sealing surfaces are coplanar with the front surfaces of the door posts.

3. The method of claim 1 further comprising the steps of:

providing a perimeter around the door opening;

providing a sliding door sealing surface at the bottom of the perimeter of the door opening;

removing the sliding door sealing surface at the bottom of the perimeter of the door opening; and adding the plug door sealing surface at the location where the sliding door sealing surface was removed from the bottom of the perimeter of the door opening wherein the plug door sealing surface is coplanar with the front surfaces of the door posts.

4. The method of claim 1 wherein the top track is installed to the box car prior to installing the bottom track.

5. The method of claim 1 further comprising the step of:

cleaning the box car prior to installing the plug door.

6. The method of claim 1 further comprising the steps of:

providing front and rear sliding door stops on the side of the railcar; and removing the front and rear sliding door stops prior to installing the plug door.

7. The method of claim 1 wherein the sealing surface is disposed around the perimeter of the door opening and further wherein the sealing surface is coplanar around the perimeter of the door opening.

8. The method of claim 1 further comprising the steps of:

cutting around the perimeter of the railcar;

removing a roof from the railcar;

providing a top plate above the door opening wherein the pre-existing top track is disposed on the top plate;

removing the top plate by cutting a cut-line into the top plate wherein the cut-line is flush with the inside surfaces of the door posts;

adding extensions around the perimeter of the railcar where the roof was removed; and attaching a second roof to the extensions.

9. The method of claim 8 wherein the second roof is the same as the roof that was removed from the railcar.

10. The method of claim 8 further comprising the step of:

bracing the side walls and the floor of the railcar when removing the roof of the box car.

11. The method of claim 8 further comprising the step of:

grinding welding slag to provide smooth surfaces.

12. The method of claim 8 further comprising the step of:

attaching door post extensions to the door posts wherein the door post extensions provide a coplanar sealing surface with the door posts.

13. The method of claim 8 further comprising the step of:

repairing damage to the door posts prior to adding the extensions to the box car.

14. The method of claim 8 wherein the extensions comprise door post extensions, side post extensions, side plate extensions and end plate extensions.

15. The method of claim 1 further comprising the steps of:

attaching a plug door to the top track and the bottom track for sliding within the top track and on the bottom track wherein the plug door translates towards the railcar to cover the door opening;

providing a sealing surface on the plug door; and engaging the sealing surface of the plug door to the sealing surfaces of the door posts.

* * * * *